Aug. 4, 1970    H. KIETZ    3,523,276
ECHO SOUNDER SYSTEM
Filed Aug. 2, 1968    2 Sheets-Sheet 1

INVENTOR
Hans Kietz
BY Spencer & Kaye
ATTORNEYS

United States Patent Office 3,523,276
Patented Aug. 4, 1970

3,523,276
ECHO SOUNDER SYSTEM
Hans Kietz, Bremen, Germany, assignor to Fried. Krupp Gesellschaft mit beschrankter Haftung, Essen, Germany
Filed Aug. 2, 1968, Ser. No. 749,762
Claims priority, application Germany, Aug. 2, 1967,
B 93,793
Int. Cl. G01s 9/70
U.S. Cl. 340—3
12 Claims

ABSTRACT OF THE DISCLOSURE

Echo sounder system for a fishing net including means for producing a long-range upwardly directed sounding from such net to sound the surface and determine the depth at which the net is disposed in the body of water and means for producing both a short-range upwardly and downwardly directed sounding from such net to sound the net and fish in close proximity to such net and means for recording the echoes received from the soundings of the long- and short-range sounding means. The recording means includes means for providing a separate recording of echoes received from long-range soundings in the upward direction as well as short-range soundings, both in the upward and downward directions, and for providing a large scale recording of echoes received from short-range soundings. By this arrangement, the depth of the net with respect to the surface of the body of water and the location of the net with respect to fish can be monitored.

BACKGROUND OF THE INVENTION

The present invention relates to an echo sounder system for a fishing net wherein echo soundings are produced from the net and the echoes received from such soundings are recorded by means provided therefor, particularly, an echograph on board a surface vessel.

Heretofore, it has been known to provide echo sounder systems for fishing nets wherein the soundings are effected only in one of two directions. In particular, prior art echo sounder systems for fishing nets have been designed to provide soundings either from the upper-side of the fishing net downwardly towards the floor of the body of water or from the under-side of the fishing net upwardly towards the surface of the body of water. By making the soundings in either of these directions, echo recordings can be made to indicate the location of fish in the vicinity of the net and, at the same time, the depth of the net with respect to either the surface or the floor of the body of water.

In cases where the soundings are made from the upper-side of the fishing net downwardly towards the floor of the body of water, the depth of the net is determined by the difference between the depth of the body of water, as measured by an echo sounder usually provided on the surface vessel, and the distance of the net from the floor of the body of water.

In contrast to the above-described prior art net echo sounder systems, an altogether different approach is followed where submarines are concerned. The depth to which a submarine is submerged and the distance it is from the floor of the body of water is derived by separately made soundings from the submarine, in both the upward and downward directions. By this approach, the total depth of the body of water is derived by adding together the results of the soundings made in both directions.

It is, therefore, an object of the present invention to provide a more effective and useful echo sounder system for a fishing net.

SUMMARY OF THE INVENTION

The present invention is premised on the concept that where fishing net echo sounder systems are concerned, it is of primary importance to provide two types of information, first, a clearly legible and useful recording of short-range soundings, which indicate conditions in the immediate vicinity or close proximity to the net, and second, as accurate an indication of the depth of the net in the body of water as possible. Moreover, the present invention is based on the consideration that the actual depth of the body of water is significant only when the fishing net is near the floor of the body of water, i.e. in those cases where the echo sounding of such floor falls within a range regarded as in the immediate proximity of the net. Therefore, in order to obtain the desired information, the present invention was developed to provide echo soundings in both upward and downward directions from the submerged fishing net itself.

In brief, according to the present invention, a net echo sounder system is provided wherein means are located at the fishing net for producing soundings in an upward direction as well as soundings in a downward direction. The echoes received from such soundings are recorded on means, preferably an echograph, located on the surface vessel. The echograph, according to the present invention, includes means for providing a large scale recording of short-range echo soundings, alternating soundings made from the net downwardly and upwardly over a short sounding range some 10 meters. Such soundings provide fish and net echoes within the immediate proximity of the net. The echograph also includes means for recording echo soundings made over a greater range or distance, e.g. soundings made from the net upwardly for some 100 meters to monitor surface echoes indicating the present depth of the net.

The system of the present invention can be effected in a relatively inexpensive manner. It would be necessary only to enlarge the oscillator or echo sounder arrangement in present echo sounding systems to provide means for making soundings in both the upward and downward directions. In a simple form of the present invention, it would be sufficient to provide a common echograph for recording the echoes received from soundings made in both directions. Such an echograph can be provided with means for switching the recordings being made from those which respond to echo soundings made upward from the net to those which respond to echo soundings made downward from the net and can be provided with means for recording soundings of different time lengths, i.e. of different sounding ranges. A conventional echograph can be used for this latter purpose, by adding switching control means for other speeds of the writing stylus.

An echograph used in the manner described above can provide two basic types of recordings or data representing upwardly directed soundings made at different ranges. First, a large scale recording of a short-range sounding to indicate conditions existing in the immediate proximity of the net can be provided. Such a short range, for example, can be in the order of about 40 meters. This large scale recording of short-range upward soundings is very similar to the recording made in the downward direction, which indicates the location of fish with respect to the net. Second, compared to the mentioned large scale recording, a relatively small scale recording of the long-range upwardly directed soundings provide an indication of the depth at which the net is located with respect to the surface of the water as derived from the long-range soundings being reflected from such surface.

Assuming, for example, that it is intended to obtain a large scale recording of the immediate zone surrounding the upper-side of the net, it is necessary to make only relatively short-range upwardly directed soundings. Such short-range soundings need only be approximately equal to or, preferably, somewhat smaller than the downwardly directed soundings (e.g. an upward sounding range of about 40 meters as compared to a downward sounding range of about 60 meters). It would not be difficult to provide short-range upwardly directed soundings, inasmuch as the downwardly soundings which alternate with the upwardly directed soundings are of relatively short duration. Indeed, it would be possible not only to provide short-range upwardly directed soundings, but, periodically, after a preselectable number of upwardly directed short-range soundings, to provide, instead of a short-range upwardly directed sounding, a single relatively long-range upwardly directed sounding. The latter sounding is made to determine the depth of the net with respect to the surface of the body of water.

According to the present invention a particularly advantageous and preferred embodiment of a recording means includes an echograph which has a writing stylus that is moved on an endless belt or band. By this arrangement, the writing stylus can make traces on oppositely traveling reaches of the endless band. The echograph also includes a graph or tape on which the recording is made, which includes at least two recording zones, an upper and a lower zone. The lower recording zone is used to represent the downward movements of the band and stylus, which correspond, for example, to soundings made in the downward direction. The upper recording zone is used to represent the upward movements of the band and stylus, which correspond, for example, to soundings made in the upward direction. Moreover, the lower recording zone corresponds to a short-range downwardly directed sounding within the immediate vicinity of the net (e.g. 60 meters), while the upper recording zone corresponds to the short-range upwardly directed sounding. In the latter case, a recording is provided on the upper recording zone, which represents the short-range soundings (e.g. about 40 meters). Besides, for long-range soundings (e.g. about 400 meters), the whole width of both the adjacent zones together are used to record surface echoes when they occur. During the recording of the long-range sounding, the band and the writing stylus are moved at a slower rate than in the case of recording the short-range soundings.

DESCRIPTION OF THE PREFERRED EMBODIMENTS

Figure 1:
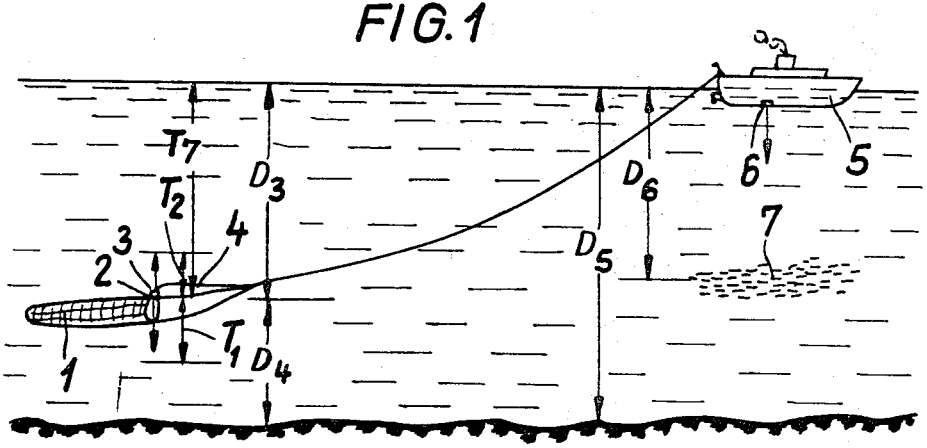
FIG. 1 is a schematic view of a fishing vessel having both a ship echo sounder and a net echo sounder.

In the net echo sounder system shown in FIG. 1, an echo sounder or oscillator 2 for generating downwardly directing soundings and an echo sounder or oscillator 3 for generating upwardly directed soundings are disposed on the net 1 where a cable 4 joins the upper-side, with respect to the floor of the body of water, of the net 1. The two oscillators 2 and 3 are in communication with a control and indicator device on board the fishing or surface vessel 5, via the cable 4.

The FIG. 1 echo sounding system includes recording means on board the surface vessel 5 for recording the soundings from the net 1. The recording means includes an echograph, like that shown in FIGURE 3. The echograph provides a recording of short-range soundings from the net 1 e.g. of from 0 to 60 meters in the downward direction and also a recording e.g. of from 0 to 40 meters in an upward direction. These two ranges are marked $T_1$ and $T_2$. These short ranges are sounded primarily for the purpose of determining conditions existing in the immediate proximity of the net 1. The echograph provides for both these relatively short-range soundings a large scale recording. Compared to ordinarily used echograph devices with recording tapes for sounding ranges of some 100 meters the echo sounder system described below uses one complete half of ordinary recording tape to record just a short-range sounding of some 10 meters. Thus in this relatively large scale recording more details in the vicinity of the sounders can easily be observed.

In addition, it is necessary to determine and record the depth $D_3$ of net 1. This is accomplished by a long-range sounding marked $T_7$ made in the upward direction. The distance $D_4$ of the net 1 from the floor of the body of water is not directly monitored or recorded by the net echo sounder system when the distance $D_4$ is greater than the maximum downward range $T_1$ (i.e. 60 meters). The sum of $D_3$ plus $D_4$ is equal to the depth of the water $D_5$ which is recorded by the ordinary echo sounder or oscillator 6 normally found on board the surface vessel 5. The distance $D_4$ is determined, when $D_4$ is greater than $T_1$, by calculating the difference between $D_5$, the depth of the body of water, and $D_3$, the depth of water to the net 1. The echo sounder 6 on board the surface vessel 5 can, furthermore, record the depth $D_6$ of a school of fish 7 located below the ship 5. The depth of the net $D_3$ is then adjusted according to the depth $D_6$ determined for the school of fish 7.

Figure 2:
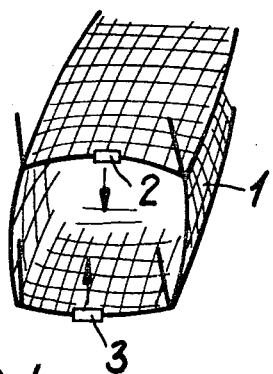
FIG. 2 is a schematic view of part of a fishing net having a net echo sounder arrangement different from that shown in FIG. 1.

It is also possible, as shown in FIG. 2, to dispose the echo sounders 2 and 3 on the net so that the oscillator 2, which directs its soundings downwardly, is disposed at the head cable on the upper-side of the net, and the oscillator 3, which directs its soundings upwardly, is disposed on the under-side of the net near the cable. The significance of this arrangement will be explained in detail below.

Figure 3:
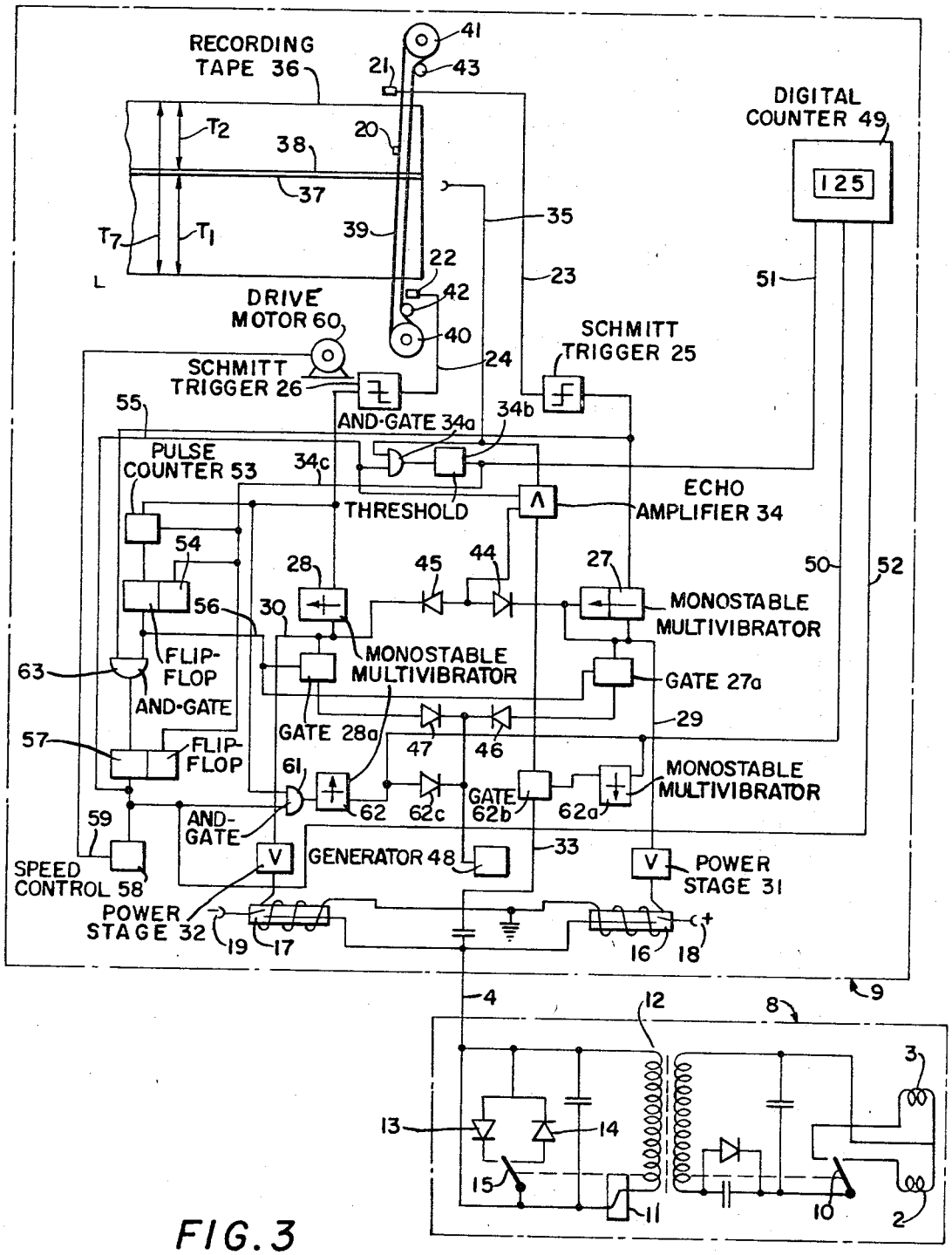
FIG. 3 shows a circuit diagram of the net echo sounder system of FIG. 1, according to the present invention.

As best seen in FIG. 3, the net echo sounder system of FIG. 1 includes an oscillator or net echo sounder circuit in a housing member 8 fastened to the net 1 and a circuit in housing member 9 disposed on board the surface vessel 5. The net 1 oscillator circuit of member 8 and the circuit of member 9 on board the surface vessel 5 are operatively connected to each other by the cable 4. The circuit of the net echo sounder is so constructed that the soundings produced alternate between those directed upwardly and those directed downwardly. For this purpose, a switching device 10 is provided in the circuit within housing member 8. The switching device 10 is operated by a relay 11, which alternately connects oscillator 2 for downward soundings and oscillator 3 for upward soundings, respectively, to a transformer 12. The relay 11 itself is operated by control pulses, which emanate from the echograph on board the vessel 5.

In order to synchronize the position between an echograph stylus 20 and its position relative to the recording tape 36 of the echograph and the position of switch 10, a positive pulse is provided to flip the switch 10, when downwardly directed soundings are taken, and a negative pulse is provided to flip the switch 10 back, when upwardly directed soundings are taken. This synchronization is controlled by diodes 13 and 14 and by a switch 15 which is coupled to switch 10.

The positive and negative pulses, respectively, thus produced are fed to cable 4 by a voltage source 18 or 19, respectively, via a magnetically actuated switch 16 or 17, respectively, disposed in the member 9. The switches 16, 17 are controlled by a pulse generator connected to the echograph. The pulse generator includes the writing stylus 20 of the echograph and two permanent contact members 21 and 22, which are disposed along the path of the circulating endless belt or band 39. The writing stylus 20 being mounted on the band 39 is carried along such path. Normally, a residual potential is always present at the writing stylus 20; however, this is not sufficient to effect the writing operation. An echo writing voltage is generated by the echoes received during the sounding operation, and is superimposed on the potential already existing at the writing stylus 20 to cause the same to write. The residual potential at the writing stylus 20 serves to generate a control pulse which is fed to a line 23 or 24, respectively, upon the passage of the writing stylus over the contact member 21 or 22, respectively. Whichever one of the lines 23 or 24 receives such control pulse, that line in turn excites via a pulse generator or Schmitt trigger 25 or 26, respectively, a monostable multivibrator 27 or 28, respectively. The particular multivibrator 27 or 28, flips into an unstable state upon being excited. Thus, a power stage 31 or 32, respectively, is controlled via lines 29 or 30, respectively, is connected to a corresponding magnetic coil of one of the corresponding switches 16 or 17, respectively.

The echo pulses emanating from whichever one of the oscillators 2 or 3, respectively, is operating, travel via transformer 12 to cable 4 and a line 33, to the input of an amplifier 34. The output of the amplifier 34 is connected, via a line 35 and a contact element (not shown in the drawing), to the writing stylus 20. Also not shown are means providing, in a generally known manner by controlling a record-amplifier's gain as a function of the received echo-pulse's intensity, an abrupt change in the darkness of the indication recorded on the tape. Thus it is possible to record weak echoes, e.g. from fish, as grey indications above the floor of the body of the water, which is indicated in black or beneath the surface of the body of the water, which is similarly indicated by a contrasting color, respectively. On the other hand, it would also be possible to do the opposite and record the weak echoes in black and the strong echoes in gray.

A recording of the echo pulses received is made on a graph or tape 36 of the echograph. The tape 36 is intended to cover the above-mentioned short-range soundings $T_1$ and $T_2$. These ranges are recorded in two different recording zones provided on the tape 36. The recording zones start at a common zero line or two closely adjacent zero lines 37 or 38, respectively, depending on the direction in which the sounding is being taken. For instance, if the sounding is taken in an upward direction, this sounding will be recorded on the top of the strip, whereas if the sounding is taken in a downward direction, this sounding will be recorded on the lower zone of the tape 36. For this purpose, the writing stylus 20 is on an appropriately disposed moving stylus band 39 which is guided by rollers 40, 41, 42 and 43. The stylus band 39, when moving, includes two oppositely moving reaches. The two reaches of the stylus band 39 are disposed relatively close to each other so that the stylus 20 moves substantially in the same path while traversing both reaches of band 39.

When the stylus 20 moves downwardly or in the lower zone of tape 36 on the first reach of the circulating band 39, the echo pulses received from the downward soundings in the range $T_1$ are recorded on the tape 36. As a precautionary measure, in order to prevent recording beyond the bounds of the particular zone corresponding to the direction in which the sounding is taken, an appropriate blockage of the echo amplifier 34 is provided at appropriate locations along the path of the stylus 20 during the movement of the stylus band 39. This blockage is controlled by the monostable multivibrator 27 or 28, respectively, i.e. via decoupling diode 44 or 45, respectively. The pulse given to one of the control lines 23, 24, respectively, when the writing stylus 20 passes over the appropriate pulse-producing contact 21 or 22, respectively, effects a blockage of amplifier 34 prior to the time stylus 20 reaches the edge of the writing tape 36. Furthermore, the same pulse will effect a resetting of switches 10 and 15 to alternately perform upward and downward soundings, upon operation of the switch 16 or 17, respectively. The switches 10 and 15, of course, must be reset before the stylus 20 reaches the zero line for each respective zone, namely, 37 for the downward sounding zone and 38 for the upward sounding zone.

When the monostable multivibrator 27 or 28, respectively, flips back into its stable state, the trailing edge of the output pulse produced therein controls a pulse generator 48, via blocking rectifier 46 or 47, respectively. The blocking rectifier 46 or 47, respectively, provides a signal to excite either one or the other of the oscillators 2, 3, via cable 4. Once one of the oscillators 2, 3 is excited, it initiates a sounding operation in its corresponding sounding direction. The emission of the sound pulse, by the particular oscillator operating, occurs exactly at the moment when the writing stylus 20 traverses the zero line 37 or 38, respectively.

Regarding the recording zones, it is provided that the downward direction recording zone corresponds to a range $T_1$ of about 60 meters as measured from the oscillator 2 on the net 1 at the cable 4. The upward direction recording zone, on the other hand, corresponds to a distance or range of about 40 meters, as measured from the oscillator 3 on the net 1 at the cable 4.

In order to indicate the depth $D_3$ of the fishing net 1 on the echograph, the range of the upwardly directed sounding is periodically extended. For instance after every tenth short-range upward sounding $T_2$, which provides a large scale representation of the tape 36, a long-range upward sounding $T_7$ is made. As mentioned above, the long-range sounding is on the order of e.g. about 400 meters. For this purpose of the switching from short-range upward to long-range upward sounding the speed of a drive motor 60 for the stylus band 39 is to be decreased in an appropriate ratio. As the upward sounding cannot be activated before the new stationary speed of the band 39 is reached, after each preselected number of e.g. 10 short-range upward soundings the downward sounding to follow is suppressed. This is controlled by a preselectable pulse counter 53 connected to the Schmitt trigger 26 generating the upward sounding's control pulses. The pulse counter 53 sets a bistable multivibrator or flip-flop 54 at each tenth control pulse of short-range upward sounding emanating via Schmitt trigger 26 from the pulse generator contact member 22. Via line 56 the flip-flop 54 effects blockage of both the gates 28a for short-range upward sounding as well as of 27a, thus blocking the regularly occuring downward sounding when the stylus 20 passes along the contact member 21. Now however, the control pulse excited by the pulse generator contact member 21 passes through an and-gate 63 and sets a flip-flop 57, the latter one activating a speed control circuit 58, via line 59 varying the drive motor's 60 speed in a way, that the variation of the speed follows optimal transient time characteristics. After the drive motor 60 has reached the new steady speed the stylus 20 passes along the contact member 22 and activates the Schmitt trigger 26 to generate a control pulse passing an and-gate 61; thus a monostable multivibrator 62 is actuated, the trailing edge of the output pulse of which controls the pulse generator 48 via a blocking rectifier 62c, and a long-range upward sounding is generated via cable 4 and oscillator 3. The transient time of instability of the monostable multivibrator 62 is adjusted to be only as long as necessary to start the sounding when the stylus 20, having passed the contact member 22, reaches the lower edge of the recording tape 36. Thus the zero line of the long-range upward sounding is not that one 37 or 38 but near to the lower edge of the recording tape.

Besides controlling the reduction of the speed of the drive motor 60 the flip-flop 57 serves to increase the amplification sensitvity of the echo amplifier 34 via a line 55 to enable clear recording of the echo pulses received from long distance. However, since short distance echo pulses received from the vicinity above the net 1 would now be recorded with a much too high intensity, they should be suppressed. Therefore a monostable multivibrator 62a is provided to control a gate 62b that blocks received echo pulses during a time representing e.g. half the range of $T_7$. Thus only echo pulses from the upper region of the body of water are recorded on the tape 36. This then is again accomplished, as already described above, by providing visibly abrupt changes in the darkness of the recording on the tape 36 to differentiate between echoes of the surface of the body of water and e.g. echoes from fish.

So long as the flip-flop 57 is set only the high-intensity echo pulses from the surface of the body of water will pass an and-gate 34a and a threshold unit 34b and then via line 34c reset the pulse counter 53 as well as both the flip-flops 54 and 57. Thus via less activated speed control circuit 58 and line 59 the drive motor 60 is brought back to high speed for short-range soundings and by disengaging gates 27a and 28a the echograph apparatus is ready again for short range echo sounding.

A digital indication of the depth $D_3$ of the net is provided by a digital counter 49. The counter 49 is actuated via a line 50 connected to the output side of the monostable multivibrator 62 that activates the generator 48. The counter 49 is stopped by an incoming echo signal from the surface of the body of water via a stop line 51 connected to the threshold unit 34b. The counter 49 is reset to zero by a resetting signal, which is the same signal for activating the speed control circuit 58 to reduce the drive motor's speed before generating a long distance upward sounding, via a resetting line 52. Because of the and-gate 34a only during the long-distance range operation and because of the threshold unit 34b only the strong echo pulses received from the surface of the body of water the line 34c can get a reset pulse and the line 51 can get a stop pulse only at the end of long-distance range operation.

Figure 4A:
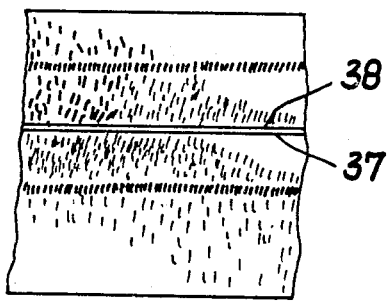
FIG. 4a shows a portion of an echograph recording, made from an echo sounder arrangement as shown in FIG. 2, the recording zones being separated from each other.
Figure 4B:
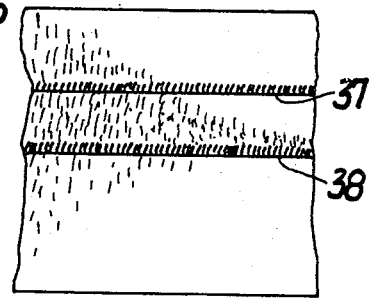
FIG. 4b shows a portion of an echograph recording, made from an echo sounder arrangement as shown in FIG. 2, the recording zones being overlapping with respect to each other.

In a net echo sounder or oscillator arrangement at the net 1, as shown in FIG. 2, closely adjacent zero lines 37 and 38, like those described in connection with FIG. 1, can be employed. This is illustrated by FIG. 4a, where there is shown a recording of a uniformly increasing fish density in the net 1 opening. By offsetting the zero lines 37 and 38 with respect to each other, a distance corresponding to the distance to the head cable and the bottom cable, a substantially accurate depiction of the real distribution of the fish in the net 1 opening can be achieved.

The oscillator arrangement according to FIG. 2 has the advantage that the area of the net 1 opening is monitored toward the upper side as well as the lower side of the net 1 with every sounding taken.

Figure 5:
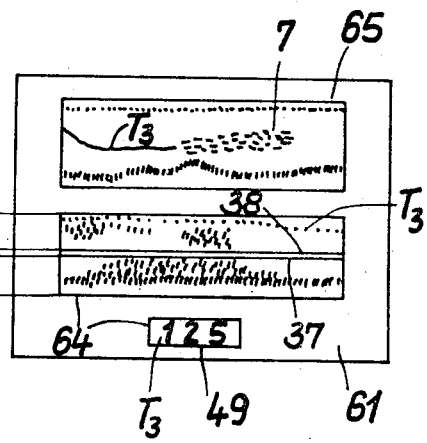
FIG. 5 is a view of a combined ship and net echo sounder indicator means.

As shown in FIG. 5, the indicator devices 66, including the counter 49 and the echograph recording 64 of the two zones corresponding to the directions in which soundings are taken from net 1, is combined with the indicator device 65 showing a recording of the echograph of the ordinary echo sounder on board the surface vessel.

The indicator of the echo sounder on board the vessel records the echoes received from schools of fish disposed beneath the vessel, as well as echoes from the floor of the body of water. Moreover, the depth $D_3$ of the net 1 can be indicated in a correct relationship with respect to the surface vessel by simply additionally providing a special writing stylus 67 for this purpose, mechanically controlled by known means as a function of the measured depth $D_3$ of the net, e.g. by mechanical connection to the counter 49.

The indicator 64 of the net echo sounder can record, in addition to the large scale recordings of short-range soundings in both directions of the immediate proximity of the net 1, ranges $T_1$ and $T_2$, respectively echoes from the surface of the body of water, using range $T_7$ with its zero line at the lower edge of the recording tape, as described above. Further, the echoes received from the long-range soundings $T_7$ can be indicated by the digital indicating device 49 to provide a numerical depth reading $D_3$ of the net 1.

A plurality of modifications and different types of embodiments are possible within the framework of the present invention. In particular, it would be possible to obtain large scale recordings of the echoes received from sounding ranges $T_1$, $T_2$, and $T_7$ by separate writing bands each having its own stylus instead of a common recording head or writing band or even each of them writing on separate recording tapes.

It will be understood that the above description of the present invention is susceptible to various modifications, changes and adaptations.
fected.

I claim:
1. An echo sounder system for use in combination with a surface vessel and a fishing net drawn by the vessel and submerged in the body of water upon which the vessel is floating, said system comprising, in combination:
  (a) echo sounding means, including at least one echo sounder disposed at the net and an indicator and recording instrument carried by the vessel and electrically connected to said sounder, for selectively effecting either one of a long range sounding and a short range sounding;
  (b) switching means connected to said echo sounding means for causing only a selected one of said short range and long range soundings to be effected at any given time; and
  (c) automatic control means connected to said switching means for automatically operating said switching means according to a predetermined program which cyclically causes one of the types of sounding to be effected a predetermined number of times for each time the other of the types of sounding is effected.

2. An arrangement as defined in claim 1 wherein said short range sounding is effected upwardly and downwardly in alternation, said long range sounding is effected upwardly, and the program according to which said automatic control means operate causes said long range sounding to be effected once for each plurality of upwardly directed short range soundings.

3. An echo sounder system for a fishing net wherein soundings made by means provided on such net submerged in a body of water are recorded on a surface vessel, said system comprising, in combination:
  (a) first sounding means for producing a short range alternately upwardly and downwardly directed sounding from such net to sound a zone in close proximity to such net;
  (b) means including an echograph arrangement aboard the vessel for recording the echoes received from the soundings produced by said first sounding means and including means for providing separate large scale recordings of echoes received from the soundings produced by said first sounding means, whereby said system, by sounding both in an upward and downward direction and by recording the soundings in both directions, serves to monitor the location of such net with respect to nearby fish; and
  (c) sounding direction switching means provided in said echograph arrangement and including:
    (1) a movable contact element mounted for movement along a predetermined path;
    (2) a first stationary contact element connected to send a signal to said first sounding means for producing an upward sounding; and (3) a second stationary contact element connected to send a signal to said first sounding means for producing a downward sounding;

(4) said first and second stationary contact elements being positioned at respectively different locations along the travel path of said movable contact element for being contacted by said movable element at respectively different times thereby to separately activate said first sounding means for sounding in either one or the other of the upward and downward directions in response to the signals sent thereto.

4. An arrangement as defined in claim 3 further comprising: second sounding means for producing a long range upwardly directed sounding from such net thereby to sound the surface of the body of water for an indication of the depth at which such net is disposed; wherein said echograph arrangement serves to also record the echoes received from the soundings produced by said second sounding means.

5. An arrangement as defined in claim 4 wherein both said first and second sounding means are disposed on the upper side of the net with respect to the floor of the body of water, said first sounding means has a range of the order of 10 meters, said second sounding means has a range of the order of 100 meters, and said echograph arrangement is controlled for recording the soundings produced by said first sounding means to a larger scale than the soundings produced by said second sounding means.

6. Echo sounder system as defined in claim 4 wherein said recording means further includes a digital indicating means connected for providing a digital indication of the said long range sounding of the depth of the said net.

7. Echo sounder system as defined in claim 4 wherein said echograph arrangement includes a recording tape having a separate recording zone for each of the short range upwardly and downwardly directed soundings, and a circulating band cooperatively asociated with said tape having at least one writing stylus disposed thereon, said writing stylus constituting said movable contact element and making traces of the echoes reecived from said soundings and arranged on said circulating band to make such traces alternatingly from oppositely moving reaches of said band as the same circulates, said oppositely moving reaches each corresponding to one of the sounding directions, said traces being made in opposite directions and in the particular zone on said tape corresponding to the direction in which the sounding is being made.

8. Echo sounder system as defined in claim 7 wherein said echograph arrangement uses the whole width of said recording tape with the lower edge of it serving as zero-line for the recordation zone of the said long-range upwardly directed sounding means (a).

9. Echo sounder system as defined in claim 7 including means for regulating the speed at which said band circulates and the traces made in each respective recordation zone corresponding to the particular range of the sounding being made, said band speed regulating means decreasing the band speed when the sounding is switched from short to long range, i.e. from said first sounding means to said second sounding means, and increasing the band speed when the reverse occurs.

10. Echo sounder system as defined in claim 9 wherein said first and second sounding means together constitute net sounding means, said system further comprising: vessel sounding means provided on said vessel for producing a downwardly directed sounding to determine the depth of the body of water from the surface to the floor thereof, said vessel sounding means being connected via said cable to said net sounding means; and means provided on said vessel and including a second echograph arrangement disposed in a common housing with said first-defined echograph arrangement and connected for recording echoes received from said vessel sounding means and said net sounding means.

11. Echo sounder system as defined in claim 10 wherein said speed regulating means control the movement of said band for causing the recordation zones of said upwardly and downwardly directed soundings of said net sounding means to be spaced apart from each other.

12. Echo sounder system as defined in claim 11 wherein said first and second sounding means include a first echo sounder mounted at the upper side of the net for producing the downwardly directed soundings and a second echo sounder mounted at the lower side of the net for producing the upwardly directed soundings, and said speed regulating means control the movement of said band for causing the recordation zones of said upwardly and downwardly directed soundings to overlap each other in the same manner as do the upwardly and downwardly directed net soundings themselves.

References Cited

UNITED STATES PATENTS

| | | | |
|---|---|---|---|
| 2,853,824 | 9/1958 | Schutz et al. | 340—3 X |
| 2,958,846 | 11/1960 | Luskin | 340—3 |
| 2,998,591 | 8/1961 | Lovett | 340—3 X |
| 3,307,143 | 2/1967 | Wyse et al. | 340—3 |
| 3,309,650 | 3/1967 | Ross et al. | 340—3 |

FOREIGN PATENTS

| | | |
|---|---|---|
| 987,230 | 3/1965 | Great Britain. |
| 998,489 | 7/1965 | Great Britain. |

RICHARD A. FARLEY, Primary Examiner

UNITED STATES PATENT OFFICE
CERTIFICATE OF CORRECTION

Patent No. 3,523,276          Dated August 4th, 1970

Inventor(s) Hans Kietz

It is certified that error appears in the above-identified patent and that said Letters Patent are hereby corrected as shown below:

Column 1, line 7, change "B 93,793" to --B 93,763--.
Column 5, line 23, after "30," insert the following:
--respectively. The output of one of the stages 31 or 32,--;
line 52, after "top" insert --zone--. Column 8, delete
line 22. Column 9, line 42, change "reecived" to --received--.

SIGNED AND
SEALED

OCT 27 1970

(SEAL)
Attest:

Edward M. Fletcher, Jr.
Attesting Officer

WILLIAM E. SCHUYLER, JR.
                               Commissioner of Patents